INVENTORS.
Benoit R. Beaudoin
Joseph D. Cohen
David H. Jones
Lester J. Marier, Jr.
Harry F. Raab, Jr.

BY

ATTORNEY.

INVENTORS.
Benoit R. Beaudoin
Joseph D. Cohen
David H. Jones
Lester J. Marier, Jr.
Harry F. Raab, Jr.

BY
ATTORNEY.

United States Patent Office 3,671,392
Patented June 20, 1972

3,671,392
LIGHT-WATER BREEDER REACTOR
Benoit R. Beaudoin, Irwin, and Joseph D. Cohen, David H. Jones, Lester J. Marier, Jr., and Harry F. Raab, Jr., Pittsburgh, Pa., assignors to the United States of America as represented by the United States Atomic Energy Commission
Filed Mar. 15, 1971, Ser. No. 124,138
Int. Cl. G21c 5/00
U.S. Cl. 176—18
5 Claims

ABSTRACT OF THE DISCLOSURE

A light-water-moderated and -cooled nuclear breeder reactor of the seed-blanket type characterized by core modules comprising loosely packed blanket zones enriched with fissile fuel and axial zoning in the seed and blanket regions within each core module. Reactivity control over lifetime is achieved by axial displacement of movable seed zones without the use of poison rods in the embodiment illustrated. The seed is further characterized by a hydrogen-to-uranium-233 atom ratio in the range 10 to 200 and a uranium-233-to-thorium-232 atom ratio ranging from 0.012 to 0.200. The seed occupies from 10 to 35 percent of the core volume in the form of one or more individual islands or annuli.

BACKGROUND OF THE INVENTION

The invention described herein relates generally to nuclear breeder reactors and more particularly to an improved light-water-moderated and -cooled nuclear reactor of the seed-blanket type. It was made in the course of, or under, a contract with the U.S. Atomic Energy Commission.

As used in this application, the following terminology is defined below:

Seed region: That portion of a nuclear reactor core of the seed-blanket type wherein the primary activity is the fissioning of fissile material.

Blanket region: That portion of a nuclear reactor core of the seed-blanket type wherein the primary activity is the conversion of fertile to fissile fuel by neutron capture.

Breeder reactor: A nuclear reactor which produces fissile material identical with that used to maintain the fission chain. Further limited herein to reactors producing more fissile material than they consume.

Breeding ratio: The ratio of the number of fissile atoms produced to the number of fissile atoms of the same kind that have been consumed.

Fissile material: Material which will undergo fission through interaction with neutrons of any energy.

Fertile material: Material which can be converted into fissile material through neutron capture.

Fuel: Denotes fissile or fertile material or a combination of both within the seed or blanket region.

The mechanism by which fissile fuel material is produced in breeder reactors is by absorption of neutrons in fertile fuel material. For example, in breeder reactors operating within the thermal neutron spectrum, the fertile fuel material thorium-232 is normally used because of its desirable nuclear properties. Capture of a neutron by the thorium-232 causes it to become thorium-233, which very quickly changes through radioactive decay to protactinium-233. Protactinium-233 decays in turn to fissile uranium-233 at a relatively slow decay rate with the half-life of the decay process being about 27 days. A fissile uranium-233 atom is produced by the capture of a neutron in a fertile thorium-232 atom provided that the intermediate thorium-233 and protactinium are not themselves removed from the decay chain by further neutron capture. The thorium-233 isotope presents little difficulty because of its short half-life (22.1 minutes) and negligible neutron absorption cross section, with the result that virtually all thorium-233 decays to protactinium-233. Protactinium-233, however, having both a long half-life and significant neutron absorption cross section, is subject to removal from the decay chain by neutron absorption and transmutation to protactinium-234, which then decays to fertile uranium-234. Not only is a fissile atom (uranium-233) lost by a neutron absorption in an atom of protactinium-233, but the neutron economy of the reactor is adversely affected since two neutrons have been used in essentially non-productive absorptions. To achieve high breeding ratios, such non-productive neutron absorption must be reduced to very low values.

In a nuclear reactor system, neutrons are produced primarily by the fissioning of fissile fuel such as uranium-233. This source is augmented by a relatively small number of neutrons released through the fissioning of materials classified as non-fissile such as thorium-232, protactinium-233, uranium-234, and uranium-236 which have small fission absorption cross sections for fast neutrons. A requirement for all self-sustaining critical assemblies or reactors is that, for each fission occurrence, at least one neutron produced by the fission must on the average be subsequently absorbed and cause another fission occurrence to sustain the chain reaction and keep the assembly or reactor critical. Most but not all neutrons absorbed in fissile fuel cause fission, so that, for a small fraction of the neutrons absorbed in fissile fuel, the fissile fuel is destroyed by transmutation to a non-fissile form. A nuclear reactor is characterized as a breeder when, for each neutron which destroys a fissile fuel atom by absorption, slightly more than one other neutron on the average must be absorbed in fertile material to produce a fissile atom to replace the atom of fissile material consumed by the neutron absorption occurrence. Thus, a requirement for breeding is that the ratio of net neutron production per neutron absorbed in fissile material be greater than 2.0. This ratio is generally referred to as $\eta\epsilon$, with the quantity $\epsilon$ accounting for the neutron contribution from fast fissioning of non-fissile material. The value of $\eta$ must be substantially greater than 2.0 to achieve practical breeding, since non-productive parasitic absorption of neutrons occurs in all reactors as well as loss of neutrons which simply escape from the reactor.

The value of $\eta$ depends largely upon the energy of the absorbed neutron which in turn is dependent on the uranium atom ratio in light-water-moderated reactors. In water-moderated reactor systems, uranium-233 appears to be the only fissile fuel capable of sustaining breeding, with thorium-232 used as the fertile material.

It is, accordingly, a general object of the invention to provide a nuclear breeder reactor of the seed-blanket type wherein the ratio of neutron captures in thorium-232 to neutron captures in protactinium-233 is maximized.

Other objects of the invention will become apparent upon examination of the specification and appended drawings which describe a preferred embodiment of the invention.

SUMMARY OF THE INVENTION

In accordance with the invention, a light-water-moderated and -cooled nuclear breeder reactor of the seed-blanket type is provided characterized by a high ratio of neutron captures in thorium-232 to neutron captures in protactinium-233. Each core module comprises loosely packed blanket zones enriched with fissile fuel and coupled with axial fuel zoning in the seed and blanket zones to provide reactivity control with minimum loss of neutrons through non-productive absorption. The seed zones are further characterized by a hydrogen-to-uranium-233 atom ratio in the range from 10 to 200 and a uranium-233-to-thorium-232 atom ratio ranging from 0.012 to 0.200. The seed zones within each core module occupy from 10 to 35 percent of the core volume in the form of one or more individual islands or annuli. The blanket zones are characterized by a uranium-233-to-thorium-232 atomic ratio that lies in the range of .003 to .015 for the enriched blanket regions, the hydrogen-to-uranium atomic ratio lies in the range from 60 to 300, and the hydrogen-to-thorium atomic ratio lies in the range from 0.18 to 4.5 for the enriched regions. Reactors made in accordance with the invention exhibit favorable breeding performances due to the minimum loss of neutrons therein to non-productive absorption in protactinium-233 and to the absence therein of absorbers to hold down excess reactivity.

DESCRIPTION OF THE PREFERRED EMBODIMENT

Figure 2:
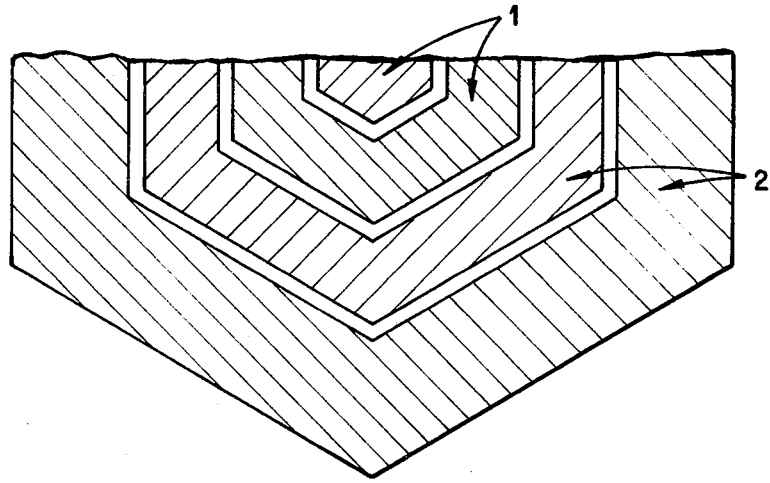
FIG. 2 is a horizontal sectional view of the reactor core module of FIG. 1.
Figure 1:
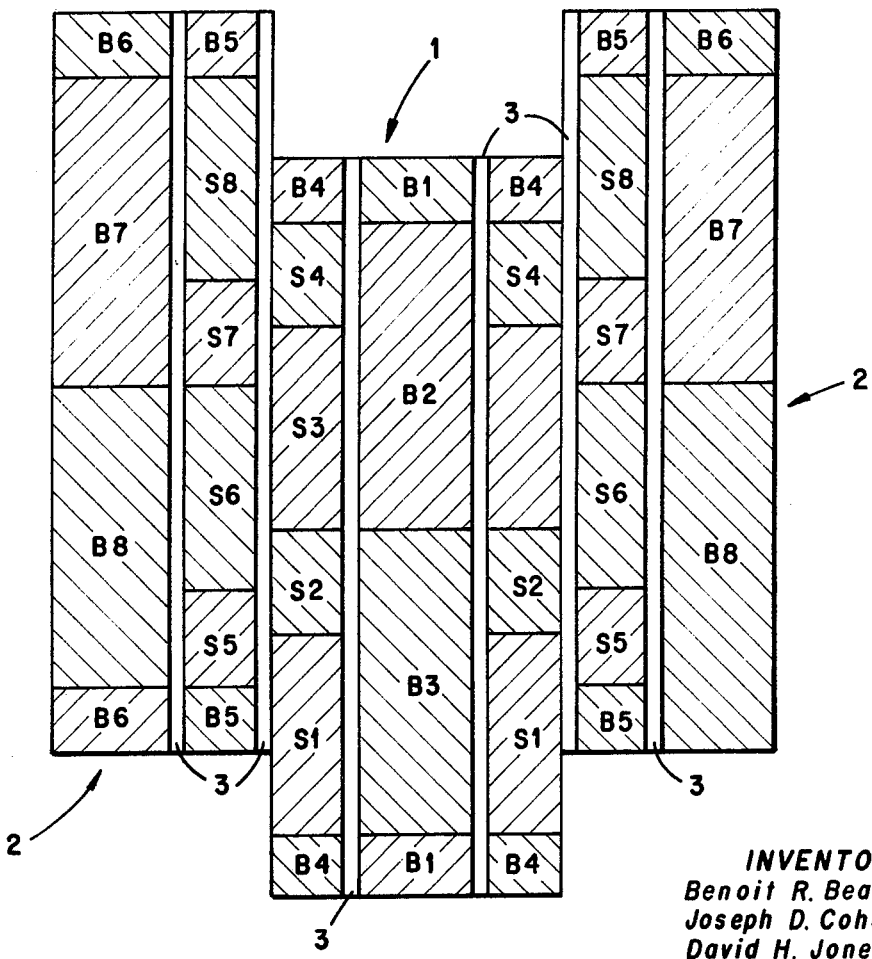
FIG. 1 is a schematic vertical sectional view of a seed-blanket reactor core module design made in accordance with the invention.

A light-water-moderated and -cooled nuclear breeder reactor of the seed-blanket type which is made in accordance with and is exemplary of the invention is schematically illustrated in FIGS. 1 and 2. As shown, the reactor is divided into movable and stationary core module portions 1 and 2, respectively, each of which is further divided axially and radially into zones having different atom densities of fissile material. Axially extending metal-water channels 3 are provided within and between the movable and stationary core module portions 1 and 2. Reference numerals designating blanket zones are preceded by the letter B and those numerals designating seed zones are preceded by the letter S. Table A lists representative ratios of hydrogen to uranium atoms and fissile to fertile atoms in the various designated zones as initially loaded.

TABLE A

| Zone: | Uranium/ thorium | Hydrogen/ uranium |
|---|---|---|
| S1 | 0.159 | 21.5 |
| S2 | 0.111 | 29.6 |
| S3 | 0.067 | 47.3 |
| S4 | 0.026 | 118.2 |
| S5 | 0.019 | 150.6 |
| S6 | 0.048 | 60.2 |
| S7 | 0.079 | 37.6 |
| S8 | 0.112 | 24.4 |
| B1 | 0 | |
| B2 | 0.004 | 186.8 |
| B3 | 0.006 | 133.5 |
| B4 | 0 | |
| B5 | 0 | |
| B6 | 0 | |
| B7 | 0.011 | 106.0 |
| B8 | 0.008 | 132.5 |

The uranium-to-thorium atom ratios in the various seed zones lie between 0.019 and 0.159 and between 0.004 and 0.011 in the enriched blanket zones B2, B3, B7, and B8. Hydrogen-to-uranium atom ratios lie between 21.5 and 150.6 in the seed zones and between 106 and 187 in the enriched blanket zones. The relative sizes of the seed and blanket zones were chosen in this particular example to give the desired reactivity behavior over operating lifetime and are shown for exemplary purposes in Table B below.

TABLE B

| | Axial length, in. | Radial width, in. |
|---|---|---|
| Zone: | | |
| S1 | 28 | 1.44 |
| S2 | 14 | 1.44 |
| S3 | 28 | 1.44 |
| S4 | 14 | 1.44 |
| S5 | 14 | 0.855 |
| S6 | 28 | 0.855 |
| S7 | 14 | 0.855 |
| S8 | 28 | 0.855 |
| B1 | 9 | 5.72 |
| B2 | 42 | 5.78 |
| B3 | 42 | 5.78 |
| B4 | 9 | 1.44 |
| B5 | 9 | 0.855 |
| B6 | 9 | 3.16 |
| B7 | 42 | 3.16 |
| B8 | 42 | 3.16 |

For purposes of illustration, in this example, each core module is initially loaded with 30 kilograms of uranium-233, 19.4 kilograms being placed in the various seed zones and 10.6 kilograms being placed in the various enriched blanket zones. A reactor core could be made up of any number of the core modules described, with each core module being capable of producing 19.2 megawatts of thermal power.

Figure 3:
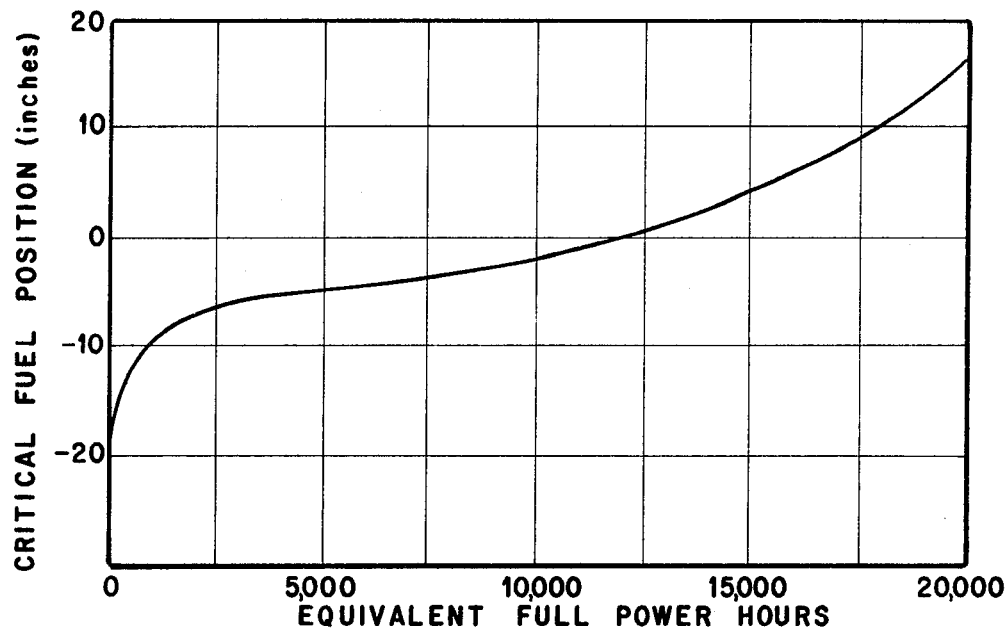
FIG. 3 shows the axial position of the movable fuel in the reactor core module design of FIGS. 1 and 2 for maintaining criticality over core lifetime.

FIG. 3 shows the axial displacement required of movable core portion 1 to maintain criticality over a core operating lifetime up to 20,000 equivalent full-power hours. In this figure the zero position has the fuel in the movable region lined up with the stationary fuel. A lifetime of about 25,000 equivalent full-power hours (19.2 thermal megawatts per core module) can be predicted from FIG. 3. For a more specific description of the concept of using movable fuel and axial zoning for reactivity control, reference may be had to the copending application of J. Ladesich, Ser. No. 34,838, filed concurrently herewith, entitled "Nuclear Reactor Control Means" and having common assignee.

Figure 4:
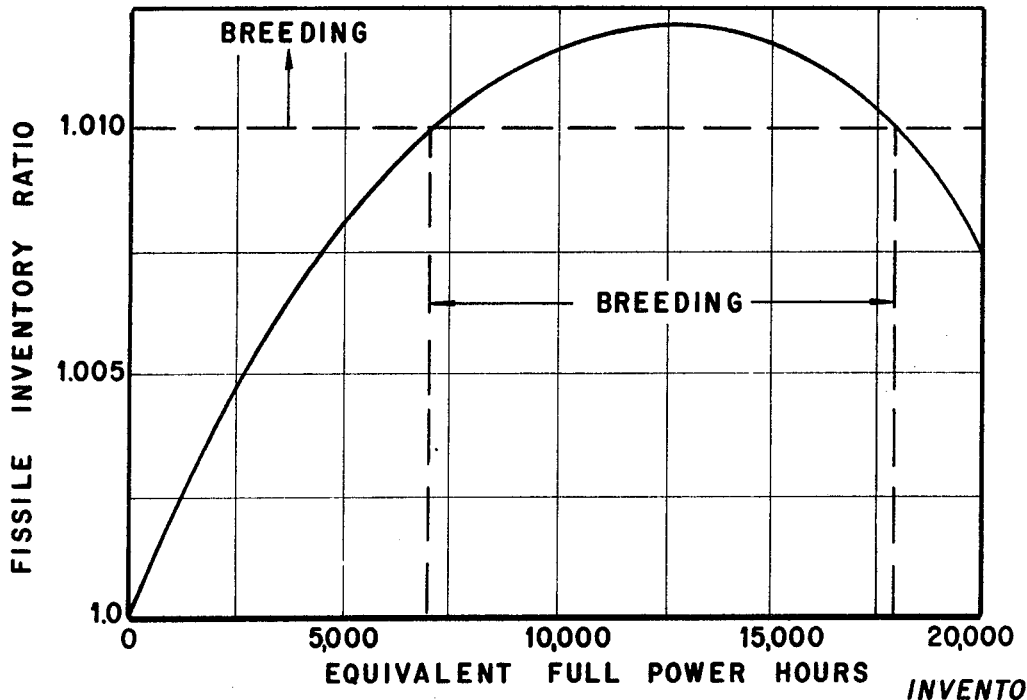
FIG. 4 shows the fissile inventory ratio or the ratio of fissile fuel inventory at different equivalent full-power hours of operation to the inventory at the initial fuel loading.

FIG. 4 shows the ratio of fissile fuel in the reactor at various operating lifetimes to the initial core loading at beginning of life. Assuming reprocessing losses of 1 percent, breeding occurs when the fissile inventory ratio exceeds 1.01. Thus a core lifetime between about 7,000 and 18,000 hours will provide a fissile fuel inventory exceeding the initial inventory after fuel reprocessing. A maximum fuel inventory in this example occurs at about 13,000 equivalent full-power hours.

To further facilitate an understanding of the invention, the following advantages and design features are enumerated:

(1) Reactors designed in accordance with the invention are of the seed-blanket type which will provide self-sustaining breeding in a heterogeneous reactor cooled and moderated by light water.

(2) The reactor core is capable of producing the uranium-233 required for breeding by using an initial inventory of uranium-235 as seed fuel. The reactor, when initially fueled with uranium-235, would be operated through its useful lifetime and the seed and blanket material reprocessed to yield uranium-233. This process would be repeated until sufficient uranium-233 is generated to provide a complete initial core loading of fissile fuel. Eventual operation with uranium-233 only as fissile fuel is contemplated, however, since uranium-233 has superior breeding properties when compared with uranium-235 and is the product produced by the breeding process with thorium-232 as fertile material.

(3) The seed zones of the core modules are initially fueled with fissile material such that the hydrogen-to-uranium atom ratio lies in the range from 10 to 200, and the fissile-to-fertile atom ratio lies in the range from 0.012 to 0.200.

(4) The seed zones of each core module occupy from 10 to 35 percent of the core volume.

(5) The blanket zones of each core module are initially fueled both with thorium-232 such that the hydrogen-to-thorium atomic ratio in most of the blanket zones lies in the range from 0.18 to 4.5 and also with the fissile uranium-233 in enriched blanket zones so that the uranium-233 to thorium-232 atomic ratio lies in the range of from 0.003 to 0.015. The hydrogen-to-uranium ratio lies in the range from 60 to 300.

(6) The specific power developed in each core module lies in the range from 300 to 1500 kw.(th.)/kg. initial fissile fuel inventory.

(7) The configuration of seed and blanket zones chosen yields acceptable reactor control through variation of the relative axial positions of movable and fixed core module portions.

(8) Axial zoning is achieved in each core module by varying the uranium-233 to thorium-232 atom ratio in discrete steps in both or either of the seed and blanket zones.

(9) Reactor cores using core modules according to the invention do not require conventional control rods for control of equilibrium xenon and protactinium or for shutdown with maximum xenon and decayed protactinium.

(10) The seed fissile fuel may take the form of uranium metal or metal alloy; uranium dioxide with or without thorium dioxide, beryllium oxide, or other high-melting-temperature, low-cross-section oxides; uranium carbide with or without diluent of thorium carbide. The seed fissile fuel may be in the form of rods, annuli, or plates of conventional configuration as used in light-water-cooled reactors.

(11) The blanket fuel is thorium-232 alone and enriched with uranium fuel and may be in the metal, dioxide, or carbide forms.

(12) The inventive concept of a loosely packed enriched blanket may be combined with the axially zoned seed control concept of copending application S.N. 124,149, or the stepped seed control concepts of U.S. Pats. Nos. 3,219,535 and 3,335,060 of common assignee to achieve breeding.

The above-listed design features and earlier description should not be construed as limiting, since various modifications can be made without departing from the scope of the invention. For example, stepped seed control concepts may be used in place of the particular movable fuel concept described herein. It is intended that the invention be limited in scope only by the appended claims.

What is claimed is:

1. In a light-water-moderated and cooled seed blanket nuclear breeder reactor having a plurality of core modules each composed of moveable and stationary sections, and characterized by a high ratio of neutron captures in thorium-232 to neutron captures in protactinium-233, the improvement in the core module comprising:
   (a) at least two fissile-fueled seed regions having hydrogen-to-uranium-233 atom ratios in the range from 10 to 200 and uranium-233-to-thorium-232 atom ratios in the range from 0.012 to 0.200,
   (b) at least one fertile-fueled blanket region having a hydrogen-to-uranium-233 atom ratio in the range from 60 to 300 and a uranium-233-to-thorium-232 atom ratio in the range from 0.003 to 0.015.

2. The core module of claim 1 wherein said seed regions occupy from 10 to 35 percent of said core module.

3. The core module of claim 1 wherein said at least two seed regions are divided axially into a plurality of zones having different atom densities of uranium-233.

4. The core module of claim 1 wherein said at least one blanket region is divided axially into zones having different atom densities of uranium-233.

5. The core module of claim 1 wherein the desired reactivity level of said core module is maintained by axial displacement of a portion of said seed and blanket regions.

References Cited

UNITED STATES PATENTS

| | | | |
|---|---|---|---|
| 3,335,060 | 8/1967 | Diener | 176—17 |
| 3,154,471 | 10/1964 | Radkowsky | 176—17 |

LELAND A. SEBASTIAN, Primary Examiner

H. E. BEHREND, Assistant Examiner